US011858273B2

(12) United States Patent
McCourt et al.

(10) Patent No.: US 11,858,273 B2
(45) Date of Patent: Jan. 2, 2024

(54) PRINTING FLUID CONTAINER WITH REMOVABLE CAP

(71) Applicant: Hewlett-Packard Development Company, L.P., Spring, TX (US)

(72) Inventors: Zachary T. McCourt, Corvallis, OR (US); Patrick V. Boyd, Corvallis, OR (US); David M. Hagen, Corvallis, OR (US); James A. Dewey, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 126 days.

(21) Appl. No.: 17/773,532

(22) PCT Filed: Apr. 17, 2020

(86) PCT No.: PCT/US2020/028771
§ 371 (c)(1),
(2) Date: Apr. 29, 2022

(87) PCT Pub. No.: WO2021/211137
PCT Pub. Date: Oct. 21, 2021

(65) Prior Publication Data

US 2022/0379623 A1 Dec. 1, 2022

(51) Int. Cl.
*B41J 2/175* (2006.01)
*B41F 31/02* (2006.01)

(52) U.S. Cl.
CPC .......... *B41J 2/17523* (2013.01); *B41F 31/02* (2013.01)

(58) Field of Classification Search
CPC .... B41J 2/175; B41J 2/17503; B41J 2/17506; B41J 2/17509; B41J 2/17523; B41J 2/1754; B41J 2/17554; B41F 31/02; B41L 27/04; B65D 41/17; B65D 47/127; B65D 47/2031; B65D 51/18; B65D 2251/0015; B65D 2251/0087
See application file for complete search history.

(56) References Cited

U.S. PATENT DOCUMENTS

| | | | |
|---|---|---|---|
| 4,496,959 | A | 1/1985 | Frerichs |
| 5,579,934 | A | 12/1996 | Buono |
| 6,015,209 | A | 1/2000 | Barinaga et al. |
| 6,112,923 | A | 9/2000 | Ma |

(Continued)

FOREIGN PATENT DOCUMENTS

| | | |
|---|---|---|
| CN | 204341651 U | 5/2015 |
| CN | 107922088 A | 4/2018 |

(Continued)

*Primary Examiner* — Anh T Vo
(74) *Attorney, Agent, or Firm* — Foley & Lardner LLP

(57) ABSTRACT

In one example in accordance with the present disclosure, a printing fluid container for a printing system is described. The printing fluid container includes a container body for holding printing fluid, a collar connected to the container body, and a cap removably engaging the collar. The collar has a plurality of collar teeth extending peripherally around the collar. The cap has a plurality of cap teeth extending peripherally around the cap. The cap teeth are configured for interfitment with the collar teeth such that rotation of the cap about the longitudinal axis in a first rotational direction effects cam-actuated removal of the cap from the collar.

15 Claims, 3 Drawing Sheets

(56) References Cited

U.S. PATENT DOCUMENTS

| | | | |
|---|---|---|---|
| 6,722,513 B1 | 4/2004 | Flood et al. | |
| 2004/0040928 A1 | 3/2004 | Noonan | |
| 2004/0226907 A1 | 11/2004 | Miceli et al. | |
| 2007/0076064 A1 | 4/2007 | Wang et al. | |
| 2008/0053949 A1 | 3/2008 | Farrar et al. | |
| 2009/0139955 A1 | 6/2009 | Fraser et al. | |
| 2018/0244446 A1 | 8/2018 | Gaillot et al. | |
| 2020/0277124 A1* | 9/2020 | Schultz | B65D 43/0231 |

FOREIGN PATENT DOCUMENTS

| | | | | |
|---|---|---|---|---|
| CN | 108285007 | * | 7/2018 | B65D 53/02 |
| KR | 100519155 | B1 | 10/2005 | |
| TW | M457700 | U | 7/2013 | |
| WO | 2016/204732 | A1 | 12/2016 | |
| WO | 2017/143084 | A1 | 8/2017 | |

* cited by examiner

PRINTING FLUID CONTAINER WITH REMOVABLE CAP

BACKGROUND

Printing fluid containers for printing systems are well known. Such printing fluid containers come in any of a number of shapes and sizes, and may take many forms. For example, a printing fluid container may take the form of a cartridge suited for selected mounting onboard the printing system as a printing fluid source. Alternatively, a printing fluid container may take the form of a bottle that is maintained separately from the printing system such that to fill/refill an onboard printing fluid source of the printing system. Where the printing fluid container is for use in filling/refilling a onboard printing fluid source, the printing fluid container may be provided with a body that holds the printing fluid and a removable lid that selectively closes access to the body.

BRIEF DESCRIPTION OF THE DRAWINGS

The accompanying drawings illustrate various examples of the principles described herein and are part of the specification. The illustrated examples are given merely for illustration, and do not limit the scope of the claims.

Throughout the drawings, identical reference numbers designate similar, but not necessarily identical, elements.

DETAILED DESCRIPTION

When producing printing fluid containers, it is important to ensure that the printing fluid containers are simple to manufacture and are easy for the ultimate customer to use. It also is desirable to employ designs whereby application of a cover onto a container body may be automated, either by press-fitting or by threading. Injection molding threaded components can require complicated molding, particularly when there is a need for both internal and external threads. The present printing fluid container employs a molded closure assembly that may be installed using conventional screw on methods, but that minimizes complexity of the molds. The present printing fluid container also provides for faster opening of the container and provides an improved customer experience. As will now be described in detail, the closure assembly includes a cap that may be removed either by twisting it off or snapping it off. This dual release mechanism provides a quick and easy uncap experience. Regardless of the removal method employed, removal is achieved with relatively little user effort.

In accordance with the aforementioned principals, a printing fluid container is provided for a printing system, the printing fluid container including a container body for holding printing fluid and a closure assembly configured to selectively close access to the container. The closure assembly includes a collar that may be fluidically connected to the container body, and a cap that may be separately applied to and removed from the collar to selectively close and open the printing fluid container. According to examples described herein, the cap and collar may have complementary surface features that provide for quick cam-actuated removal of the cap from the collar upon rotation of the cap in a first direction. The cap may be removed upon rotation of not more than 90 degrees rotation relative to the collar under a torque of not more than 1.0 Nm.

Figure 1:
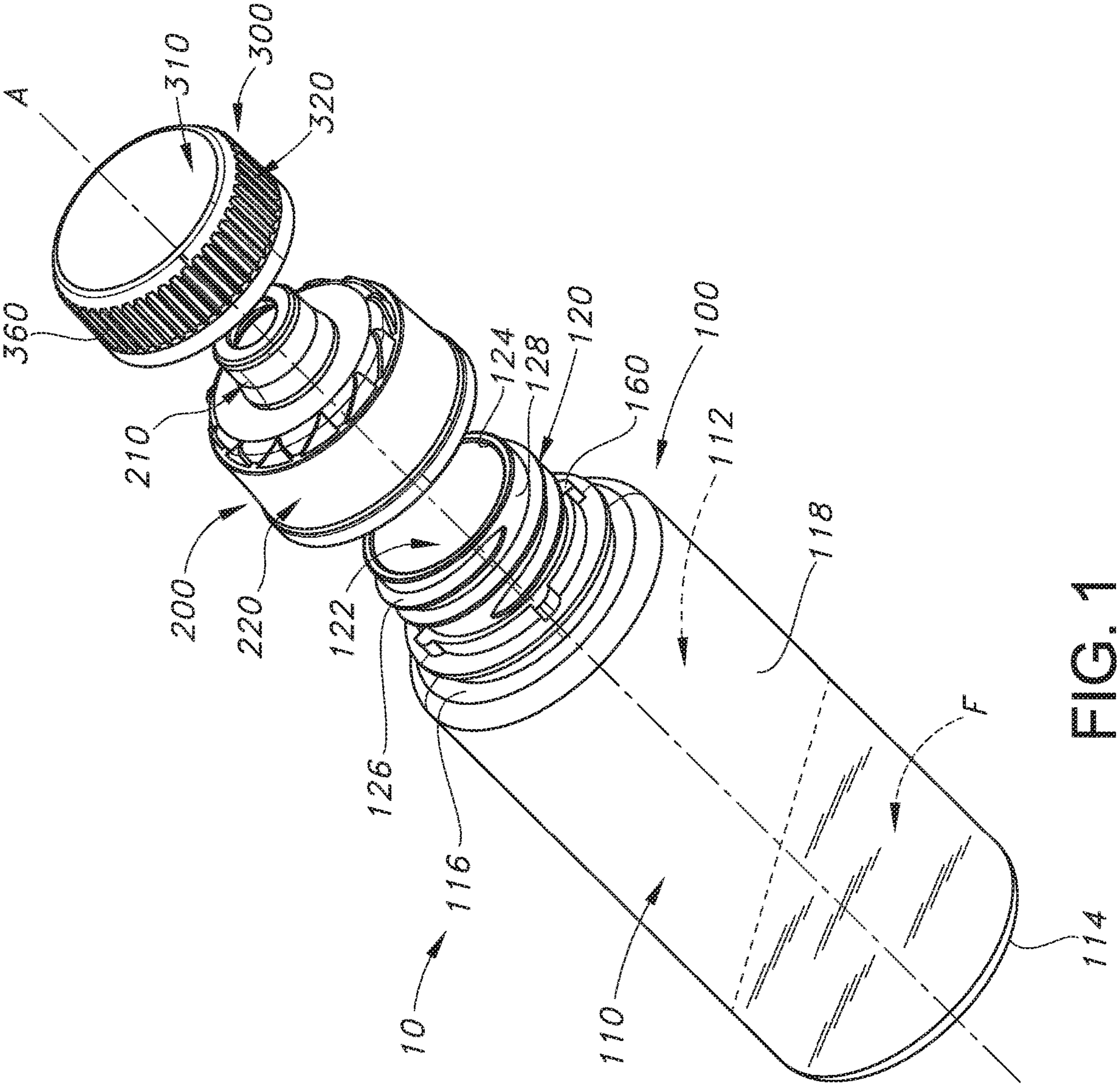
FIG. 1 is a partially exploded view of a printing fluid container according to an example of the principles described herein.

Referring initially to FIG. 1, a printing fluid container 10 is shown in exploded view, the printing fluid container including a container body 100, a collar 200, and a cap 300. The container body may take virtually any form, but is shown here as a cylindrical bottle for use in filling/refilling an onboard printing fluid source of a printing system, as will be described in greater detail below. Printing fluid container 10 thus may be used, for example, in connection with a so-called continuous ink supply system CISS (also referred to as continuous ink system CIS) of a printer.

As shown, container body 100 includes a hollow base 110 defining an interior chamber 112. The internal chamber is suited for holding a printing fluid F for use in printing. Hollow base 110 has a closed bottom portion 114, a top shoulder portion 116, and a cylindrical side-wall portion 118 extending therebetween. The top shoulder portion opens into a neck 120, which in turn defines a neck passage 122 and a neck opening 124 that provides access to the interior chamber. Printing fluid F may be introduced into interior chamber 112 via neck opening 124 and neck passage 122 (e.g., during manufacture). Printing fluid F also may be expelled from interior chamber 112 via neck passage 122 and neck opening 124 (e.g., during fill/refill of an onboard printing source of a printing system as will be described further below).

Figure 2:
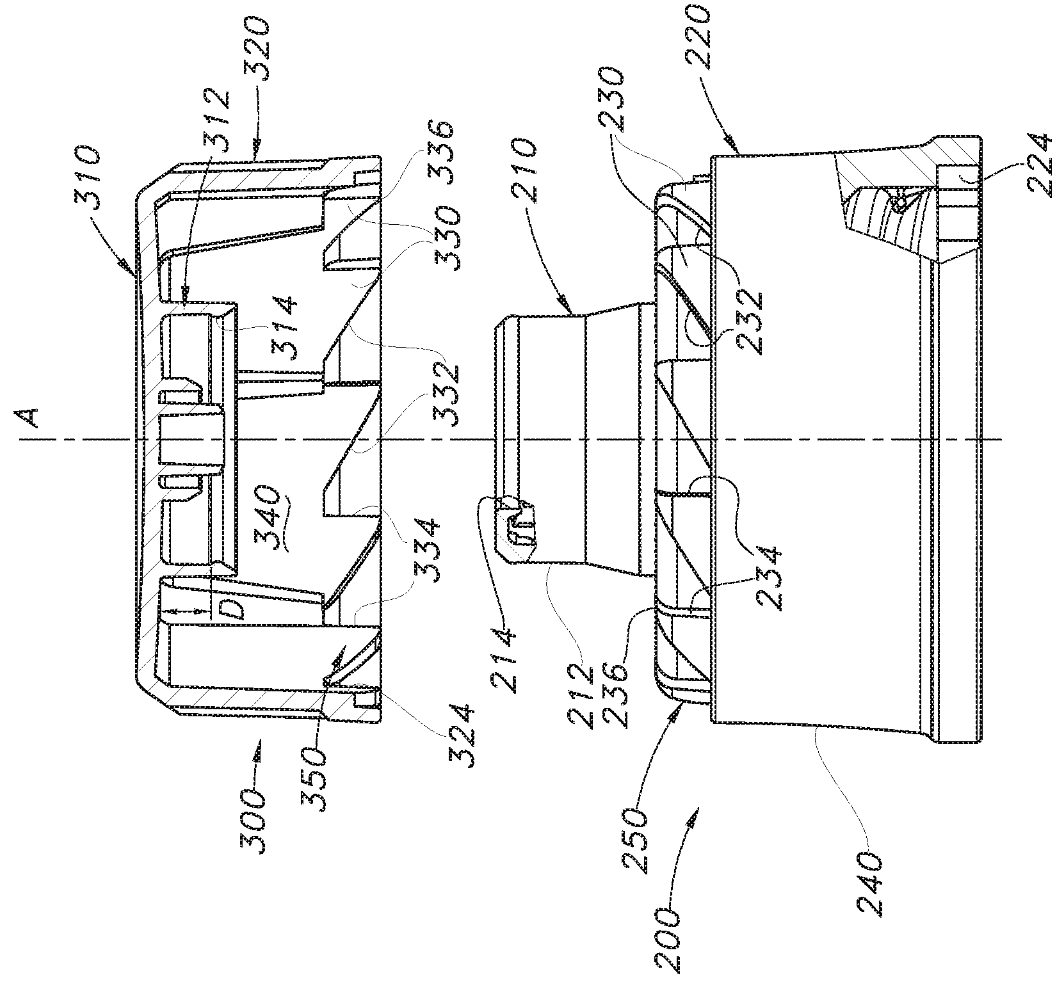
FIG. 2 is an exploded view of a printing fluid container closure assembly including a cap and collar according to an example of the principles described herein, the cap being depicted in cross-section.

Referring now to FIGS. 1 and 2, it will be noted that collar 200 is configured for selected attachment to container body 100. In some examples, the collar includes a spout 210 with an exterior spout surface 212 and a spout opening 214. The spout opening serves as the container opening when the collar is attached to the container body. The collar further includes a peripheral collar body 220 that defines a collar passage 222 that is accessible via a collar opening 224 to selectively fluidically connect the neck opening to the spout. The spout thus is fluidically connected to interior chamber 112 when the collar is attached to the container body. Accordingly, printing fluid may be dispensed through spout 210 to fill/refill an onboard printing fluid source of a printing system as is herein described.

Although collar 200 is depicted as being configured for selected application to the container body 100, it will be understood that the collar may be fixed to the neck or may form an integral part of the neck.

Where the collar and container body are separable, the printing fluid container may be provided with attachment features to provide for selected attachment of the collar to the container body. In some examples, the attachment features take the form of complementary threads to provide for threaded attachment of the collar to the container body. In the depicted implementation, the container body is provided with first threads 126 on an exterior neck surface 128 to define a threaded neck. Correspondingly, the collar is provided with complementary second threads 226 on an interior collar body surface 228 to define a threaded collar. Collar 200 thus may be applied to container body 100 by aligning the collar body with the neck along longitudinal axis A, and rotating the collar in a first direction, typically clockwise, about the longitudinal axis.

Although the container body is depicted herein as having threads on an exterior surface, and the collar is depicted as having threads on an interior surface of the collar body, it will be understood that the container body may have interior surface threads and the collar may have exterior surface threads.

Figure 3:
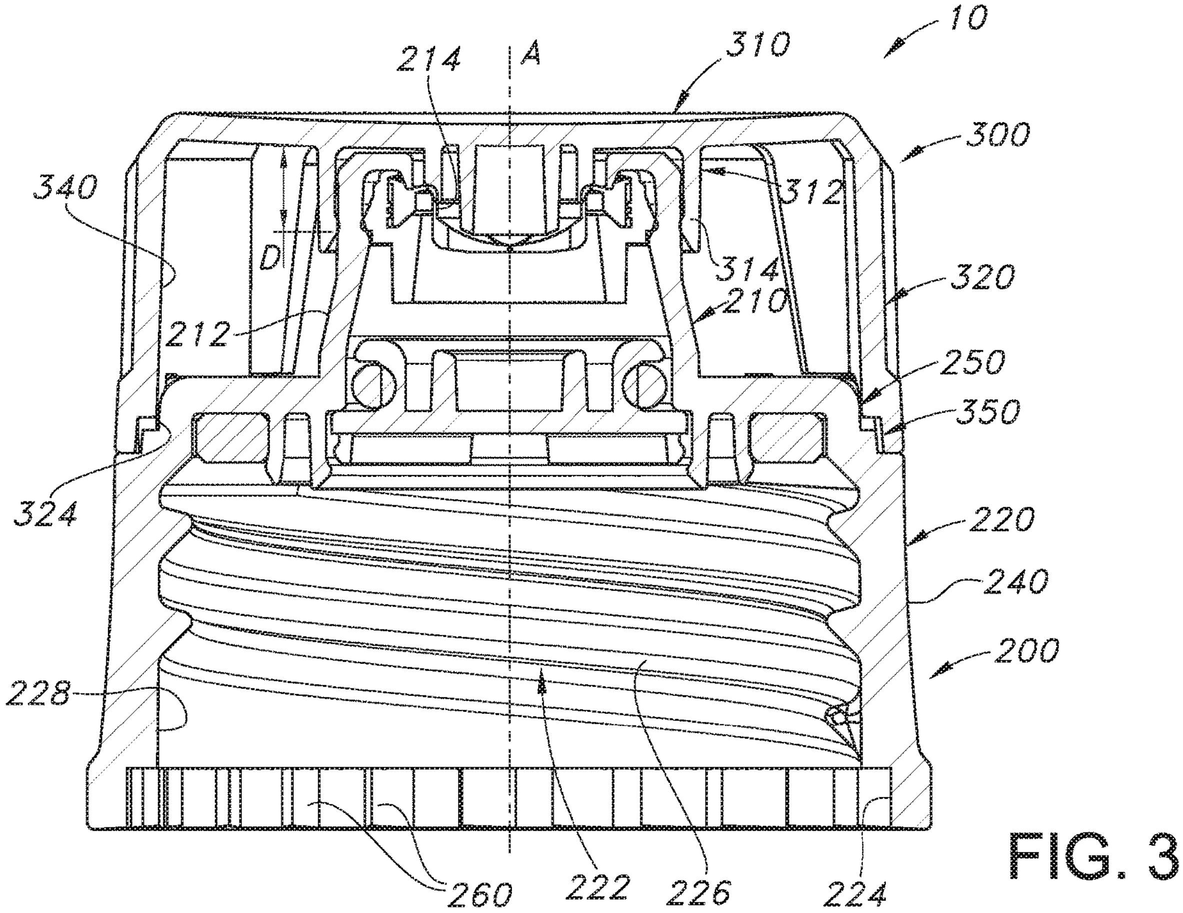
FIG. 3 is a cross-sectional view of a printing fluid container cap and collar, according to an example of the principles described herein.

Referring now to FIGS. 1-3, it will be noted that cap 300 is configured to removably engage collar 200, and thereby, to selectively close the printing fluid container. More particularly, the cap includes a lid 310 configured to cover spout 210, sealing the container opening when the cap is in place. More particularly still, the lid includes a cap clip 312 that extends from an undersurface thereof to mate with spout 210. The cap clip may employ a peripheral ridge 314 that frictionally engages the exterior spout surface to resist removal of the cap from the collar. An O-ring also may be employed to form a seal between the cap clip and the spout. The cap thus may be press-fit (or snap-fit) onto the collar to hold the cap in place.

As shown, ridge 314 may be formed on the cap clip at a distance D from the undersurface of lid, and engages the spout at a corresponding distance D from the spout opening such that the cap will be fully released upon traversing a distance D along longitudinal axis A. A torque of between 0.2 Nm and 1.0 Nm preferably will be sufficient to overcome the frictional engagement between the cap clip and spout, and thus will be sufficient to remove the cap from the collar.

Although ridge 314 is shown herein as projecting from the cap clip, it will be appreciated that the ridge may project from the spout to the same effect. It also will be appreciated that other frictional features similarly may be employed to releasably secure the cap to the collar.

Focusing now on FIGS. 2 and 3, it will be noted that cap 300 further includes a peripheral skirt 320 defining a cap opening 324. In accordance with the principals described herein, the peripheral skirt 320 is configured to closely interfit with collar body 220. More particularly, the peripheral skirt and collar body define a pair of cylinders with complementary interior/exterior surface features that promote concentric alignment thereof.

The aforementioned complementary interior/exterior surface features may take the form of teeth disposed on respective interior/exterior surfaces of the cap and collar. Collar 200 thus may include a plurality of collar teeth 230 evenly distributed around the collar body. Cap 300 correspondingly may include a plurality of cap teeth 330 evenly distributed around the cap. The collar teeth and cap teeth are configured for cammed interfitment along longitudinal axis A such that the cap teeth are interleaved with the collar teeth upon application of the cap to the collar body. Upon rotation of the cap in a first direction, the cap teeth engage the collar teeth to effect cam-actuated removal of the cap from the collar.

To promote cam-actuated removal of the cap from the collar, collar teeth 230 define a plurality of collar cam surfaces 232 (also referred to as collar ramps), and cap teeth 330 define a plurality of cap cam surfaces 332 (also referred to as cap ramps). The collar cam surfaces and cap cam surfaces are configured to cammingly engage one another upon rotation of the cap in a first rotational direction, resulting in sliding passage of the cap cam surfaces over the collar cam surfaces to effect removal of the cap from the collar. Each cam surface has surface characteristics to accommodate cap removal under a torque of not more than 1.0 Nm, and preferably, a torque of between 0.2 Nm and 1.0 Nm.

As shown, collar cam surfaces 232 form collar ramps that are inclined peripherally toward the spout opening 214 in a first rotational direction, preferably at an angle of less than 45 degrees. Cap cam surfaces 332 correspondingly form cap ramps that are inclined peripherally toward the cap opening 324 at an angle corresponding to the incline angle of collar cam surfaces 232, but in a second rotational direction opposite the first rotational direction. The collar ramps (and/or the cap ramps) define a longitudinal span of at least a distance D such that the ridge will clear the collar upon not more than 90 degrees rotation of the cap the in a first rotational direction about the longitudinal axis. Stated otherwise, the cap will travel a distance D along a path parallel to longitudinal axis A upon not more than 90 degrees rotation of the cap in the first rotational direction.

In some examples, the collar ramps are inclined toward spout 210 in a counterclockwise direction (as viewed from the spout) and the cap ramps are inclined toward cap opening 324 in a clockwise direction (as viewed from the cap lid). The cap thus may be removed from the collar by relative rotation in a counterclockwise direction (as viewed from the cap, looking toward the collar).

Collar teeth 230 also may define a plurality of collar stop surfaces 234 (also referred to as collar risers), and cap teeth 330 may define a plurality of cap stop surfaces 334 (also referred to as cap risers). The collar stop surfaces 234 and cap stop surfaces 334 are configured to fixedly engage each other upon rotation of the cap in a second rotational direction, opposite the first rotational direction. The collar thus may be locked relative to the cap during rotation of the cap in the second rotational direction. Rotation of the cap about longitudinal axis A in the second rotational direction thus will result in corresponding rotation of the collar with the cap.

As shown, collar stop surfaces 234 form collar risers, each of which extends in a direction substantially parallel to longitudinal axis A. Cap stop surfaces 334 similarly form cap risers, each of which extends in a direction substantially parallel to a longitudinal axis A. Rotation of the cap about the longitudinal axis in a second rotational direction thus effects engagement of the cap risers and collar risers to rotatably tighten the collar onto the container body (e.g., where a threaded collar is to be attached to a threaded neck of a container body).

As described herein, the collar teeth are surface features that rise radially outwardly from an exterior collar body surface 240. Similarly, the cap teeth are surface features that rise radially inwardly from an interior cap surface 340. The ramps and risers may be canted radially inwardly to help maintain sliding contact between the collar teeth and cap teeth during rotation of the cap relative the collar. The collar ramps and collar risers intersect in rounded collar teeth tips 236, and the cap ramps and cap risers intersect in rounded cap tips 336, thereby promoting alignment of the cap teeth and collar teeth when the cap is applied to the collar.

Although the collar is depicted herein as having collar teeth on an exterior collar body surface, and the cap is depicted as having cap teeth on an interior cap surface, it will be understood that the collar may have interior surface teeth and the cap may have exterior surface teeth without departing from the principals herein described.

The depicted printing fluid container 10 includes a collar with twelve collar teeth 230 equally distributed along an exterior collar body surface (also referred to as the collar periphery), each collar tooth having a cam ramp and a cam riser as described above to define substantially triangular collar teeth. Printing fluid container 10 also includes a cap with twelve cap teeth equally distributed along an interior cap surface (also referred to as the cap periphery), each cap tooth having a cam ramp and a cam riser as described above to define substantially triangular cap teeth. This arrangement of collar teeth and cap teeth has been found to be well-suited for application and removal of the cap relative to the collar of a printing fluid container. With substantially triangular teeth on each of the collar body and cap, the collar teeth and cap teeth substantially entirely overlap when the cap is applied to the collar body. Accordingly, the cap ramps will fully traverse the collar ramps upon 30 degrees rotation of the cap about the longitudinal axis, effecting removal of the cap from the collar. This rotational span provides the desired ease of cap removal, while still providing the desired tactile feedback to the user, and still allowing rapid alignment and seating of cap on the collar during application/reapplication of the cap to the collar.

It will be appreciated that fewer teeth generally will correspond to the need for more rotation to remove the cap, and will complicate alignment and seating of the cap. More teeth generally will allow quicker removal with less rotation of the cap, but will undesirably reduce the longitudinal span (also referred to as throw) achieved by rotation of the cap, and/or may make cammed passage of the cap teeth over the collar teeth more difficult (e.g., if the slope of the collar and cap ramps were increased to increase throw). Increasing the number of teeth thus could unacceptably increase the effort required to remove the cap. Furthermore, where too little rotation effects cap removal, tactile feedback to the user may be insufficient.

While the depicted printing fluid container has been described with twelve collar teeth and twelve cap teeth, other arrangements may be employed in accordance with the principals described herein. The collar may include between four and twenty-four collar teeth. The cap correspondingly may include between four and twenty-four cap teeth. It will be appreciated that the cap of a printing fluid container employing twenty-four collar teeth and twenty-four cap teeth (in the configuration described above) would be removable upon 15 degrees rotation. Similarly, the cap of a printing fluid container employing four collar teeth and four cap teeth (in the configuration described above) would be removable upon 90 degrees rotation. The slope and size of the teeth would vary depending on the number of teeth, as could the surface characteristics employed. In any event, the collar teeth and cap teeth preferably are configured such that the cap may be removed upon rotation of the cap in a first rotational direction under a torque of not more than 1.0 Nm.

Referring still to FIGS. 2 and 3, it will be appreciated that collar teeth 230 may be considered to collectively define a sawtooth collar lip 250 disposed on a periphery of the collar. Cap teeth 330 similarly may be considered to collectively define a sawtooth cap lip 350 on a periphery of the cap. More particularly, collar body 220 has a sawtooth collar lip on an exterior collar body surface 240, and cap skirt 320 has a sawtooth cap lip 350 on an interior cap surface 340.

Sawtooth collar lip 250 defines a plurality of interleaved collar ramps 232 and collar risers 234 such that the sawtooth collar lip extends around the collar to with undulating surface profile. Sawtooth cap lip 350 similarly defines a plurality of cap ramps and cap risers such that the sawtooth cap lip extends around the cap with an undulating surface profile complementary to the surface profile of sawtooth collar lip 250. Therefore, when cap 300 is applied to collar 200, sawtooth cap lip 350 and sawtooth collar lip 250 collectively define a peripheral ring of consistent radial depth.

Movement of cap 300 in the first rotational direction (e.g., counterclockwise) thus effects engagement between the cap ramps and the collar ramps. More particularly, rotating the cap in the first rotational direction effects cammed engagement of the cap ramps and collar ramps to separate the cap from the collar. The rotation required to effect cap removal is dependent on the size and shape of the ramps employed, but should be accomplished upon rotation of the cap by a release rotation of not more than 90 degrees. For example, where the sawtooth collar lip includes twelve ramps equally distributed around a collar periphery and spanning the collar periphery (as shown in FIGS. 1-3), the cap ramps will completely traverse the collar ramps upon 30 degrees rotation of the cap. Complete traverse of the collar ramps by the cap ramps, in turn, will move the cap a from its seated position (shown in FIG. 3) by a distance corresponding to the longitudinal span of the collar ramps (a distance D). Where the cap is press-fit (or snap-fit) onto the collar and held in place using an attachment feature (such as peripheral ridge 314), the longitudinal span of the collar ramps will be sufficient to allow the attachment feature to clear the collar (or cap) upon effecting a release rotation of the cap.

To apply/reapply cap 300 to collar 200, the cap and collar may be positioned along longitudinal axis A with the sawtooth cap lip 350 and sawtooth collar lip 250 generally aligned, and the cap press-fit (or snap-fit) onto the collar. It will be appreciated that some misalignment between the sawtooth cap lip and sawtooth collar lip may be addressed by rounded collar tips 236 and cap tips 336 at the intersections between the ramps and risers.

Once the cap is applied to the collar, movement of cap 300 in a second rotational direction (e.g., clockwise) effects engagement between the cap risers and the collar risers. More particularly, rotating the cap in the second direction thus effects fixed engagement of the cap risers and collar risers to effect rotation of collar 200 with cap 300. Rotation of the cap in the second rotation direction thus translates rotational torque from the cap to the collar, which in turn may be used to tighten collar 200 onto container body 100. More particularly still, cap 300 and collar 200 may be effectively locked together such that rotation of the cap in the second rotational direction correspondingly threads collar body 220 onto correspondingly threaded neck 120 of container body 100, typically through multiple revolutions of the cap/collar combination. The cap may employ frictional grip features 360 on an exterior surface thereof to enhance user grip such that adequate torque may be applied when rotating the cap/collar combination.

It will be appreciated that rotation of the cap in the first or second rotational direction will not remove the collar from the container body because the cap and collar are only locked together during rotation in the first rotational direction. To remove the collar, the collar itself is rotated in the first rotational direction, typically through multiple revolutions of the collar. In some examples, container body 100 may be provided with peripheral tabs 160, and the collar provided with corresponding tab seats 260 configured to lock the collar onto the container body.

Figure 4:
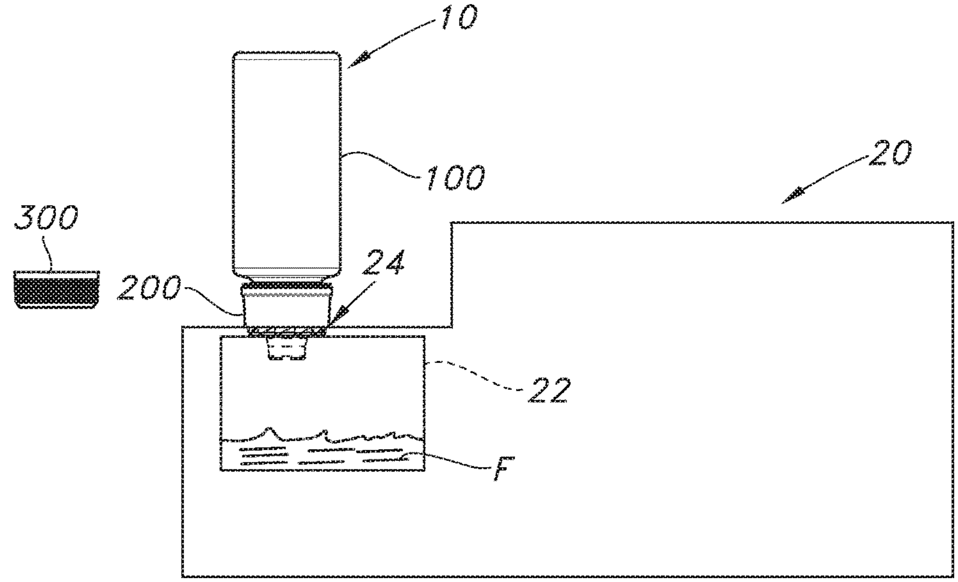
FIG. 4 is a simplified illustration of a printing fluid container coupled with a printing system for fill/refill of an onboard printing fluid source with printing fluid, according to an example of the principles described herein.

As shown in FIG. 4, printing fluid container 10 may be used in connection with a printing system 20 to fill/refill an onboard printing fluid source 22 with printing fluid from the printing fluid container. To do so, cap 300 is removed from collar 200, thereby exposing spout 210 and providing fluidic access to the interior chamber 112 of container body 100.

With the cap removed, printing fluid container 10 may be positioned to align spout 210 with a fluidic input 24 of onboard printing fluid source 22, and printing fluid may be poured into the onboard printing fluid source, either by gravity or under an applied force. Once filling/refilling is complete, printing fluid container 10 may be removed from printing system 20, cap 300 may be applied/replied to collar 200, and the printing fluid container 10 may be stored for future use.

The preceding description has been presented to illustrate and describe examples of the principles described. This description is not intended to be exhaustive or to limit these principles to any precise form disclosed. Many modifications and variations are possible in light of the above teaching.

What is claimed is:

1. A printing fluid container for a printing system, the printing fluid container comprising:

a container body for holding printing fluid;

a collar fluidically connecting the container body to a container opening, the collar having a plurality of collar teeth distributed around the collar; and a cap removably engaging the collar along a longitudinal axis to cover the container opening, the cap including a plurality of cap teeth distributed around the cap, the cap teeth being configured for interfitment with the collar teeth along the longitudinal axis such that rotation of the cap about the longitudinal axis in a first rotational direction effects cam-actuated removal of the cap from the collar and rotation of the cap about the longitudinal axis in a second direction effects fixed rotation of the collar with the cap.

2. The printing fluid container of claim 1, wherein the collar teeth defining a plurality of collar cam surfaces and the cap teeth define a plurality of complementary cap cam surfaces.

3. The printing fluid container of claim 2, wherein the collar includes between 4 and 24 teeth, each tooth having a collar cam surfaces inclined toward the container opening in the first rotational direction.

4. The printing fluid container of claim 3, wherein the cap is removed from the collar upon not more than 90 degrees rotation of the cap in the first rotational direction.

5. The printing fluid container of claim 2, wherein the collar includes 12 teeth, each with a collar cam surfaces inclined toward the container opening in the first rotational direction such that the cap is removed from the collar upon not more than 30 degrees rotation of the cap in the first rotational direction.

6. The printing fluid container of claim 2, wherein the collar is secured to the container body through rotation of the collar in a second rotational direction, the collar teeth defining a plurality of collar stop surfaces and the cap teeth define a plurality of cap stop surfaces such that rotation of the cap about the longitudinal axis in the second rotational direction effects engagement of the cap stop surfaces and collar stop surfaces to rotatably secure the collar to the container body.

7. The printing fluid container of claim 1, wherein the cap is removable from the collar upon not more than 90 degree rotation of the cap about the longitudinal axis in a first rotational direction under a torque of not more than 1.0 Nm.

8. The printing fluid container of claim 1, wherein the cap teeth are surface features extending around an interior surface of the cap and the collar teeth are surface features extending around an exterior surface of the collar such that the cap teeth are interleaved with the collar teeth upon application of the cap to the collar.

9. A printing fluid container for a printing system, the printing fluid container comprising:

a container body configured to hold printing fluid;

a collar selectively applied to the container body, the collar having a collar body with a sawtooth collar lip defining a plurality of collar ramps extending peripherally along an exterior surface of the collar body; and a cap removably applied to the collar, the cap having a skirt with a sawtooth cap lip defining a plurality of cap ramps extending peripherally along an interior surface of the skirt;

wherein application of the cap to the collar results in complementary engagement between the sawtooth cap lip and the sawtooth collar lip such that movement of the cap in a first direction effects cammed engagement of the cap ramps and collar ramps to remove the cap from the collar.

10. The printing fluid container of claim 9, wherein the collar includes a spout and the cap includes a cap clip configured to mate with the spout, the cap clip having a ridge that engages the spout to resist removal of the cap from the collar, and wherein the collar ramps define a longitudinal span sufficient for the ridge to clear the spout upon not more than 90 degrees rotation of the cap about the longitudinal axis.

11. The printing fluid container of claim 10, wherein the ridge clears the spout upon approximately 30 degrees rotation of the cap about a longitudinal axis.

12. The printing fluid container of claim 11, wherein the ridge clears the spout upon rotation of the cap under a torque of between 0.2 Nm and 1.0 Nm.

13. The printing fluid container of claim 9, wherein the sawtooth collar lip further defines a plurality of collar risers interleaved with the plurality of collar ramps and the sawtooth cap lip further defines a plurality of cap risers interleaved with the plurality of cap ramps such that movement of the cap in a second direction effects engagement between the cap risers and collar risers to move the collar with the cap.

14. The printing fluid container of claim 13, wherein the container body includes first threads and the collar body includes complementary second threads such that clockwise movement of the cap tightens the collar onto the container body, but counterclockwise movement of the cap removes the cap from the collar without removing the collar from the container body.

15. A printing fluid container fora printing system, the printing fluid container comprising:

a container body including a threaded neck, the container body defining an interior chamber configured to hold printing fluid;

a threaded collar configured for selected application to the container body, the threaded collar having a spout in fluid communication with the interior chamber of the container body and a collar body with a sawtooth collar lip defining a plurality of interleaved collar ramps and collar risers arranged peripherally around an exterior of the collar body; and a cap configured for selected engagement with the threaded collar to cover the spout, the cap including a skirt with a sawtooth cap lip defining a plurality of interleaved cap ramps and cap risers arranged peripherally around an interior of the skirt, the sawtooth cap lip being configured for selected complementary interfitment with the sawtooth collar lip;

wherein rotation of the cap in a first rotational direction effects removal of the cap from the threaded collar via cammed engagement between the cap ramps and collar ramps through no more than 90 degrees rotation of the cap; and wherein rotation of the cap in a second rotational direction effects tightening of the threaded collar onto the container body via fixed engagement of the cap risers and collar risers to translate torque from the cap to the threaded collar.

* * * * *